United States Patent
Nagano

(10) Patent No.: US 8,848,260 B2
(45) Date of Patent: Sep. 30, 2014

(54) TRANSFER OF IMAGE DATA USING POWER SAVING STATE

(75) Inventor: Hiroyuki Nagano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 580 days.

(21) Appl. No.: 13/208,940

(22) Filed: Aug. 12, 2011

(65) Prior Publication Data

US 2012/0044542 A1  Feb. 23, 2012

(30) Foreign Application Priority Data

Aug. 19, 2010  (JP) .................................. 2010-183613
Jun. 9, 2011  (JP) .................................. 2011-129011

(51) Int. Cl.
*H04N 1/40* (2006.01)
*H04N 1/32* (2006.01)
*H04N 1/00* (2006.01)

(52) U.S. Cl.
CPC ....... *H04N 1/00896* (2013.01); *H04N 1/32598* (2013.01); *H04N 2201/0081* (2013.01)
USPC ............................ 358/448; 358/444; 358/498

(58) Field of Classification Search
USPC ................................................ 358/444–498
See application file for complete search history.

(56) References Cited

U.S. PATENT DOCUMENTS

| 8,514,777 | B1* | 8/2013 | Zhao ............................. 370/328 |
| 2004/0012580 | A1* | 1/2004 | Yamagishi et al. ........... 345/204 |
| 2006/0146374 | A1* | 7/2006 | Ng et al. ....................... 358/474 |
| 2009/0214238 | A1 | 8/2009 | Tanaka et al. | |
| 2010/0189452 | A1 | 7/2010 | Tanaka et al. | |

FOREIGN PATENT DOCUMENTS

| JP | 2005-210653 | 8/2005 |
| JP | 2009-176294 | 8/2009 |

OTHER PUBLICATIONS

Machine translation for JP 2005-210653, IDS.*

* cited by examiner

*Primary Examiner* — Qian Yang
(74) *Attorney, Agent, or Firm* — IPUSA, PLLC

(57) ABSTRACT

An image processing apparatus includes a data output control unit to output image data on a line-by-line basis in response to a line synchronizing signal, and a data output interface circuit to transfer via a bus the image data that is output from the data output control unit on a line-by-line basis in response to the line synchronizing signal, wherein the data output interface circuit makes a transition, together with the bus, from a normal state to a power saving state when a predetermined check period next following completion of transfer, by the data output interface circuit, of image data for one line output from the data output control unit passes before transfer of image data for a next one line, and returns, together with the bus, from the power saving state to the normal state for transfer of image data for the next one line.

10 Claims, 11 Drawing Sheets ical copier
TRANSFER OF IMAGE DATA USING POWER SAVING STATE

BACKGROUND OF THE INVENTION

1. Field of the Invention

The disclosures herein generally relate to an image processing apparatus, an image processing method, and a recording medium having an image processing program embodied therein. The disclosures particularly relate to an image processing apparatus, an image processing method, and a recording medium having an image processing program embodied therein by which an interface circuit having a power-saving function is effectively utilized while line isochronism is maintained, thereby improving the power-saving function.

2. Description of the Related Art

In image processing apparatuses such as digital copier machines and digital multifunctional machines, a parallel interface such as a PCI (Peripheral Component Interconnect) has been used as an interface between devices such as a CPU (central processing unit), an image processing module, and a memory.

The parallel interface has problems of racing, skew, etc., so that increases in processing speed and image quality result in the lack of sufficient transfer rate surfacing as a problem for a high-speed, high-image-quality image processing apparatus. In this regard, Japanese Patent Application Publication No. 2005-210653 discloses using for an image processing apparatus a PCI Express (registered trademark: hereinafter referred to as "PCIe") which is a high-speed serial interface that can issue a next request without waiting for a response because of separation between a request and a response.

PCIe is a standard for connecting between devices through a communication channel referred to as a link, and is defined by PCISIG (Peripheral Component Interconnect Special Interest Group). The PCIe standard sets forth a power management standard such as a transition to a power saving state by use of software and ASPM (active state power management) implemented by use of hardware.

According to the ASPM, the following operations are performed when the ASPM control bit of the configuration resister of a PCIe interface circuit is set to an enable state. Upon passage of a predetermined idle period (i.e., no-data period), the interface circuit and a bus change from the normal state (i.e., active state) to an L0s or L1 state, which is a power saving state. When a need for communication arises in the power saving state, the interface circuit and the bus are moved by hardware from the power saving state to the normal state. Without intervention from software, thus, needless power consumption is reduced during the period in which the interface circuit is idle. This achieves diligent power saving control, thereby improving an effect of reduction of power consumption.

It may be desirable to provide an image processing apparatus, an image processing method, and a recording medium having an image processing program embodied therein by which power saving is achieved for image processing.

SUMMARY OF THE INVENTION

It is a general object of at least one embodiment of the present invention to provide an image processing apparatus, an image processing method, and a recording medium having an image processing program embodied therein that substantially obviate one or more problems caused by the limitations and disadvantages of the related art.

In one embodiment, an image processing apparatus includes a data output control unit to output image data on a line-by-line basis in response to a line synchronizing signal, and a data output interface circuit to transfer via a bus the image data that is output from the data output control unit on a line-by-line basis in response to the line synchronizing signal, wherein the data output interface circuit makes a transition, together with the bus, from a normal state to a power saving state when a predetermined check period next following completion of transfer, by the data output interface circuit, of image data for one line output from the data output control unit passes before transfer of image data for a next one line, and returns, together with the bus, from the power saving state to the normal state for transfer of image data for the next one line.

In one embodiment, an image processing method includes a data output step, performed by a data output control unit, of outputting image data on a line-by-line basis in response to a line synchronizing signal, and a data transfer and state transition step of causing a data output interface circuit and a bus to make a transition from a normal state to a power saving state when a predetermined check period next following completion of transfer, by the data output interface circuit, of image data for one line output from the data output control unit passes before transfer of image data for a next one line, and causing the data output interface circuit and the bus to return from the power saving state to the normal state for transfer of image data for the next one line.

In one embodiment, a non-transitory computer-readable recording medium having an information program embodied therein for causing a computer to control a data output interface circuit to perform a data output process for outputting image data on a line-by-line bases in response to a line synchronizing signal, the program causing the computer to perform a data transfer and state transition step of causing the data output interface circuit and a bus to make a transition from a normal state to a power saving state when a predetermined check period next following completion of transfer, by the data output interface circuit, of image data for one line output from a data output control unit passes before transfer of image data for a next one line, and causing the data output interface circuit and the bus to return from the power saving state to the normal state for transfer of image data for the next one line.

According to at least one embodiment, power saving is effectively achieved in image processing that transfers image data on a line-by-line basis in response to a line synchronizing signal.

BRIEF DESCRIPTION OF THE DRAWINGS

Other objects and further features of embodiments will be apparent from the following detailed description when read in conjunction with the accompanying drawings in which.

DESCRIPTION OF THE PREFERRED EMBODIMENTS

In the following, a description will be first given of some of the problems that are addressed by the disclosures herein before providing a description of preferred embodiments.

According to the ASPM, it takes several micro seconds, for example, for an interface circuit and a bus to return from power saving state L0s or L1 to the normal state. Because of this, there is a concern as follows with respect to data transfer that requires line isochronism as in the case in which data is transferred from an image scan unit (i.e., scanner) of an image processing apparatus to a memory. Namely, when the interface circuit and the bus enter the power saving state at the beginning of image data transfer or during the image data transfer, such an action may result in an erroneous image being generated.

Against this background, Japanese Patent Application Publication No. 2009-176294 discloses detecting the beginning and end of processing of a page and switching between the enable state and disable state of the ASPM.

This technology switches a setting of the ASPM between the enable state and the disable state at the beginning and end of processing of a page. With this arrangement, a change to the power saving state is made without affecting image data transfer at the interface circuit and the bus that are situated along the transmission channel of image data supplied from the image scan unit, thereby achieving the reduction of power consumption.

However, this technology switches a setting of the ASPM between the enable state and the disable state at the beginning and end of processing of a page. This means that transition to the power saving mode may be made between pages, but the disable setting is always active during the transfer of image data for one page. The power saving function thus cannot be utilized even when transition to the power saving mode could otherwise be made during the transfer of image data for one page. There is thus room for improvement in terms of achieving power saving.

According to at least one embodiment, an image processing apparatus, an image processing method, and a recording medium having an image processing program embodied therein are provided by which power saving performance is improved while maintaining line isochronism.

Here, the term "line isochronism" refers to the fact that the transfer of image data for one line is completed within a period of one line defined by a line synchronizing signal.

In the following, preferred embodiments of the present invention will be described with reference to the accompanying drawings. The embodiments described in the following may include various limitations that may be preferable from the technological point of view. The following descriptions, however, are never intended to be limiting, and particular elements of the disclosed embodiments are not considered to be essential for the purpose of the invention.

Embodiment 1

Figure 1:
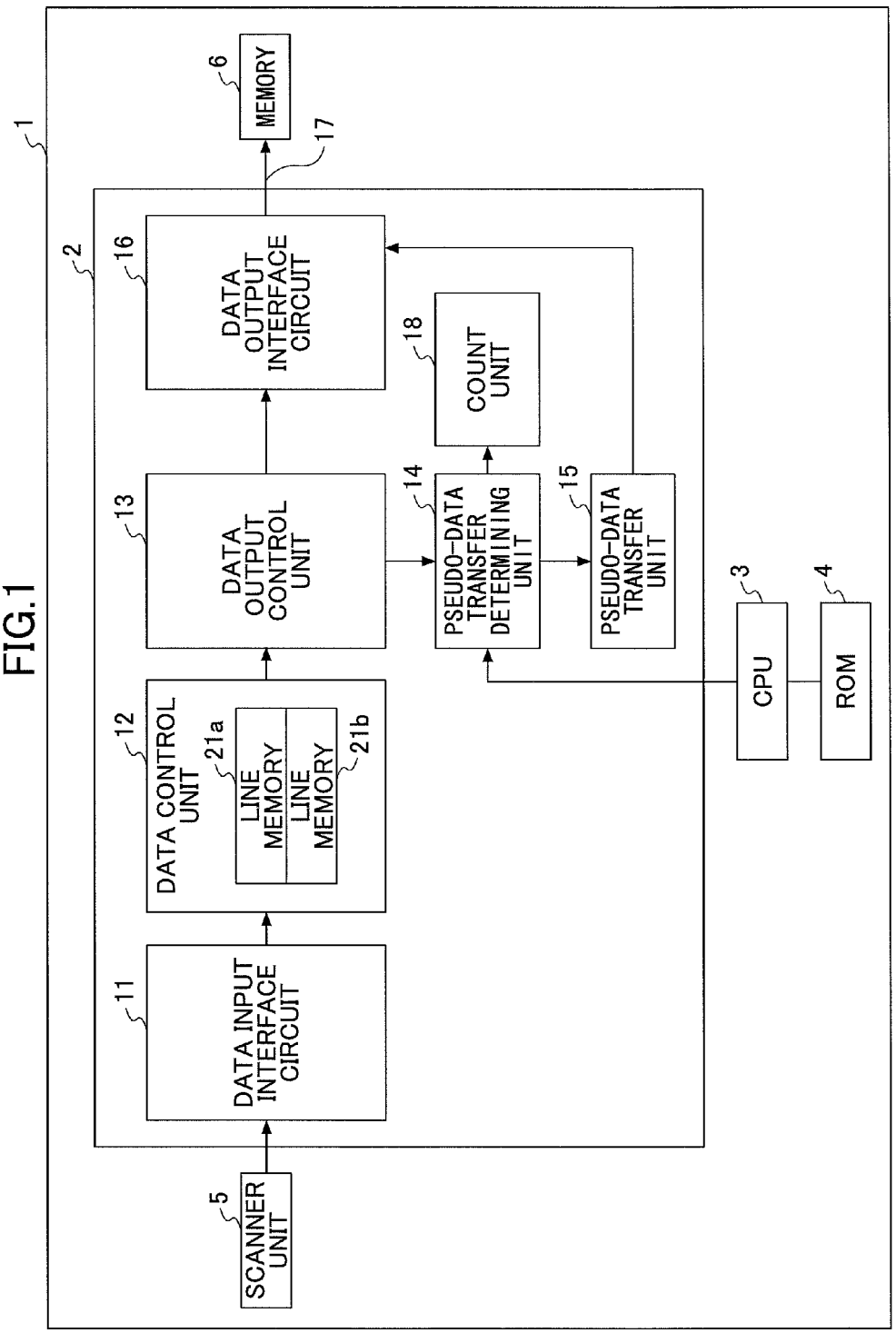
FIG. 1 is a block diagram of a main portion of an image processing apparatus according to an embodiment.

FIG. 1 through FIG. 11 are drawings illustrating an embodiment of an image processing apparatus, an image processing method, and a recording medium having an image processing program embodied therein. FIG. 1 is a block diagram illustrating main parts of an image processing apparatus 1 to which an embodiment of an image processing apparatus, an image processing method, and a recording medium having an image processing program embodied therein is applied.

In FIG. 1, the image processing apparatus 1 includes an image processing unit 2 and a CPU (central processing unit) 3. In the case of being a multifunction peripheral (i.e., MFP), the image processing apparatus 1 includes a scanner unit 5 for scanning a document image. In this case, the image processing apparatus 1 further includes a printer unit for printing an image on a sheet based on print data and an operation-&-display unit for receiving various operation inputs and for displaying information. In this case, further, the image processing apparatus 1 includes a facsimile communication unit for transmitting and receiving facsimile image data and a network unit for exchanging image data and commands via a network.

The image processing unit 2 includes a data input interface circuit 11, a data control unit 12, a data output control unit 13, a data output interface circuit 16, a pseudo-data transfer determining unit 14, and a pseudo-data transfer unit 15.

The scanner unit 5 is connected to the data input interface circuit 11. From the scanner unit 5, the data input interface circuit 11 receives image data that have been scanned from an original document in the main scan direction and sub-scan direction and have been converted into digital data. The data input interface circuit 11 receives, in addition to the above-noted image data, a page enable signal, a line synchronizing signal, a line enable signal, and so on from the scanner unit 5. The line synchronizing signal is applied to the data input interface circuit 11 at constant intervals during the processing of one page. Image data for one line is applied to the data input interface circuit 11 during the period between the receipt of a line synchronizing signal by the data input interface circuit 11 and the receipt of a next line synchronizing signal.

The data input interface circuit 11 supplies the image data and various signals received from the scanner unit 5 to the data control unit 12 (see FIG. 2-(a), (b), (c), and (d) which will be described later).

The data control unit 12 includes two line memories 21a and 21b. The data control unit 12 stores, in the line memories 21a and 21b, image data that are supplied with both an enable-state page enable signal and an enable-state line enable signal from the data input interface circuit 11. For an odd-number line, the image data of the odd-number line is stored in the line memory 21a (see FIG. 2-(e)). For an even-number line, the image data of the even-number line is stored in the line memory 21b (see FIG. 2-(f)).

Figure 2:
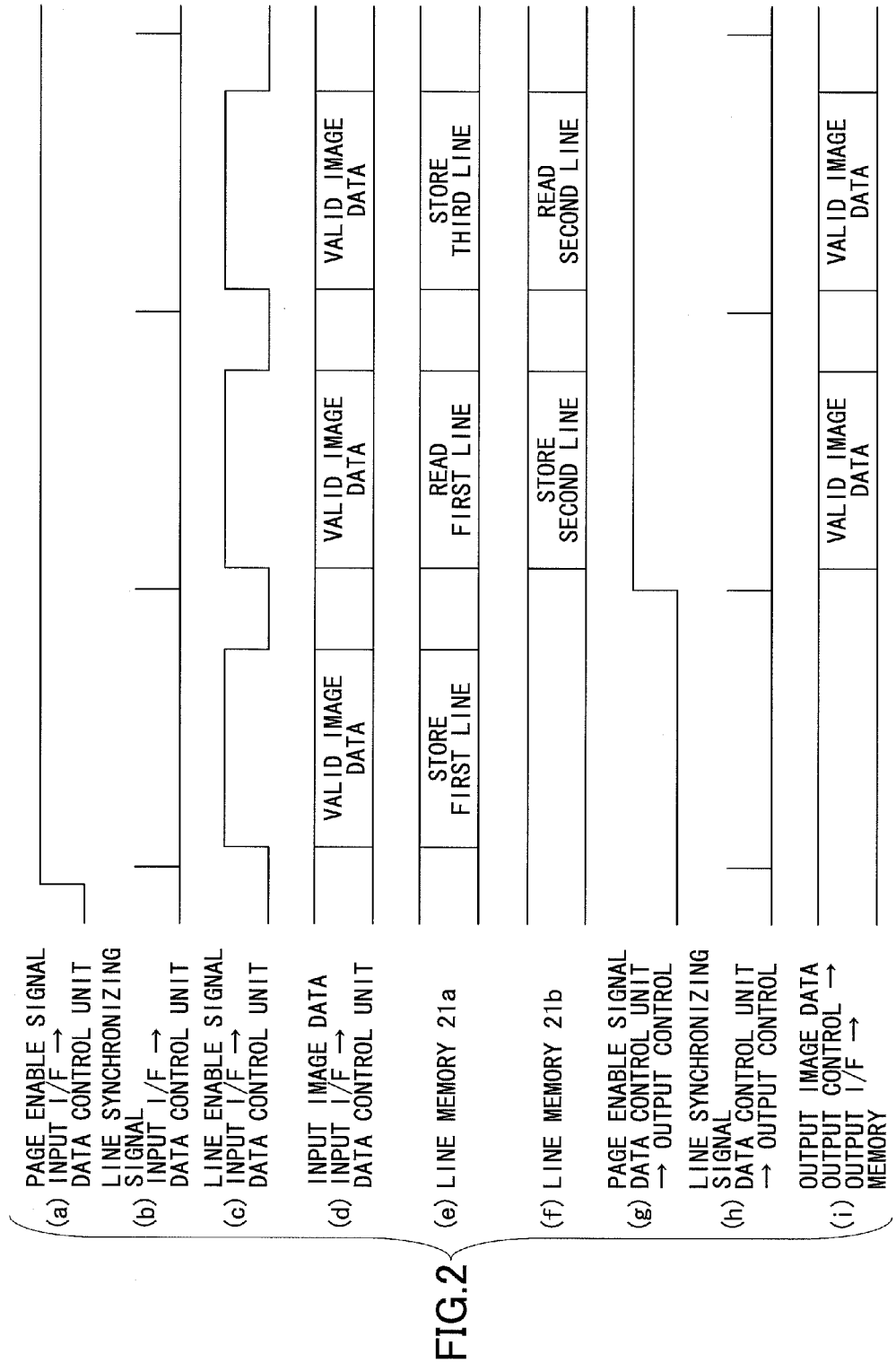
FIG. 2 is a timing chart illustrating an example of data input and output of an image processing unit illustrated in FIG. 1.

Upon receiving the line synchronizing signal of the second line from the data input interface circuit 11, the data control unit 12 supplies the page enable signal and the line synchronizing signal to the data output control unit 13 (see FIG. 2-(g) and (h)).

The data output control unit 13 reads the image data from the line memory 21a of the data control unit 12. The data output control unit 13 uses the data output interface circuit 16 conforming to PCIe or the like to transfer image data to an external device (see FIG. 2-(i)). The external device may be a memory, another image processing apparatus, or the like. In the following, a memory 6 will be used as an example of the external device. Each time the line synchronizing signal is supplied from the data control unit 12, the data output control unit 13 switches sources of image data between the line memories 21a and 21b to supply the image data to the data output interface circuit 16.

The data output control unit 13 is coupled to the memory 6, for example, via the bus 17 and the data output interface circuit 16 which conform to PCIe or the like. The bus 17 and the data output interface circuit 16 that conform to PCIe or the like can reduce power consumption by entering a power saving state through the ASPM. The data output interface circuit 16 is a circuit that implements a function (i.e., PHY function) conforming to the physical layer of the OSI (Open System Interconnection), and may be referred to simply as PHY.

The pseudo-data transfer determining unit 14 monitors the page enable signal and the line synchronizing signal supplied from the data control unit 12 to the data output control unit 13, and also monitors the state of transfer of image data supplied from the data output control unit 13 to the memory 6 via the data output interface circuit 16 and the bus 17. The pseudo-data transfer determining unit 14 uses information as follows as conditions for determining whether to transfer pseudo data which will be described later. Namely, the pseudo-data transfer determining unit 14 uses the number of counts T1 indicative of the length of one line cycle (i.e., the interval of line synchronizing signals), and also uses the number of counts T2 indicative of the length of a predetermined check period for determining whether to make a transition to the power saving state. The pseudo-data transfer determining unit 14 also uses the number of counts T3 indicative of the length of a transition period required for the data output interface circuit 16 and the bus 17 to make a transition from the normal state to the power saving state. The line synchronizing signal interval T1 refers to an interval between the consecutive line synchronizing signals. The pseudo-data transfer determining unit 14 also uses the number of counts T4 indicative of the length of a return period required for the data output interface circuit 16 and the bus 17 to return from the power saving state to the normal state. The pseudo-data transfer determining unit 14 has data indicative of these periods stored in memory. Upon the start of transfer of image data from the data output control unit 13 to the memory 6 via the data output interface circuit 16 and the bus 17, the pseudo-data transfer determining unit 14 uses a count unit 18 to count the number of counts (T5) indicative of the length of image data transfer for one line. The pseudo-data transfer determining unit 14 stores in memory the number of counts T5 obtained by the above-noted counting operation.

In the image processing apparatus 1, line isochronism is required when the image data scanned by the scanner unit 5 is transferred to the memory 6. In order to maintain line synchronism, the pseudo-data transfer determining unit 14 checks whether the inequality relationship "T2+T3+T4+T5>T1" is satisfied upon the completion of transfer of image data for one line. When the inequality relationship "T2+T3+T4+T5>T1" is satisfied, the pseudo-data transfer determining unit 14 supplies a pseudo-data-transfer requesting signal to the pseudo-data transfer unit 15 once in each check period T2 (i.e., once in the number of counts T2 indicative of the check period) until the next line synchronizing signal is supplied. The reason why this is performed will be described later.

In response to the pseudo-data-transfer requesting signal from the pseudo-data transfer determining unit 14, the pseudo-data transfer unit 15 transfers pseudo data to the memory 6 via the data output interface circuit 16 and the bus 17. With this arrangement, line isochronism is maintained by prohibiting the data output interface circuit 16 and the bus 17 from entering the power saving state. Details will be described later.

The CPU 3 controls each part of the image processing apparatus 1 based on a basic program of the image processing apparatus 1 and an image processing program of the present embodiment stored in a nonvolatile memory device such as a ROM (read only memory) 4. With this arrangement, a basic process of the image processing apparatus 1 is implemented, and the image processing method that maintains line isochronism is performed while improving power saving performance based on the image processing program.

In the image processing apparatus 1, the CPU 3 reads the image processing program for performing the image processing method of the present embodiment from a computer-readable recording medium, and stores this image processing program in the ROM 4 or the like. The computer-readable recording medium includes a ROM, an EEPROM (Electrically Erasable and Programmable Read Only Memory), an EPROM (Erasable and Programmable Read Only Memory), a flash memory, a flexible disc, a CD-ROM (Compact Disc Read Only Memory), a CD-RW (Compact Disc Rewritable), a DVD (Digital Versatile Disk), an SD (Secure Digital) card, an MO (Magneto-optical Disc) or the like. In this manner, the image processing apparatus 1 is provided to perform the image processing method that maintains line isochronism while improving power saving performance as will be described later. The image processing program is a computer-executable program written in a legacy programming language or an object-oriented programming language such as an assembler, C, C++, C#, or Java (registered trademark), and may be distributed upon being stored in the recording medium as described above.

The configuration of the image processing unit 2 illustrated in FIG. 1, i.e., the data input interface circuit 11, the data control unit 12, the data output control unit 13, the count unit 18, the data output interface circuit 16, the pseudo-data transfer determining unit 14, and the pseudo-data transfer unit 15, can all be implemented by use of hardware. At least the data output control unit 13, the count unit 18, the pseudo-data transfer determining unit 14, and the pseudo-data transfer unit 15 may be implemented by the CPU 3 executing the image processing program stored in the ROM 4.

The CPU 3 makes settings to the pseudo-data transfer determining unit 14. In particular, the CPU 3 sets the numbers of counts T1 through T4 in response to settings entered by a user on the operation-&-display unit, for example. In this manner, the CPU 3 serves as a setting unit for setting the interval of line synchronizing signals, the predetermined check period, the transition period, and the return period.

In the following, the operation of the present embodiment will be described. According to the image processing apparatus 1 of the present embodiment, line isochronism is maintained and power saving performance is improved when image data is transferred from the data output control unit 13 to the memory 6 via the data output interface circuit 16 and the bus 17.

In the image processing apparatus 1, the scanner unit 5 supplies image data of a scanned document to the data input interface circuit 11 of the image processing unit 2. Further, the scanner unit 5 supplies the page enable signal, the line synchronizing signal, and the line enable signal to the data input interface circuit 11. As illustrated in FIG. 2, the data input interface circuit 11 supplies the image data (FIG. 2-(d)) received from the scanner unit 5, the page enable signal (FIG. 2-(a)), the line synchronizing signal (FIG. 2-(b)), and the line enable signal (FIG. 2-(c)) to the data control unit 12. In FIG. 2, the data input interface circuit 11 is referred to as "INPUT I/F", the data output control unit 13 as "OUTPUT CONTROL", and the data output interface circuit 16 as "OUTPUT I/F" (the same notations will be used hereinafter).

The data control unit 12 stores the image data that is concurrently supplied with both the enable-state page enable signal and the enable-state line enable signal by storing odd-number lines in the line memory 21a and by storing even-number lines in the line memory 21b (see FIG. 2-(e) and (f)).

Upon receiving the line synchronizing signal of the second line from the data input interface circuit 11, the data control unit 12 supplies the page enable signal and the line synchronizing signal to the data output control unit 13 as illustrated in FIG. 2-(g) and (h).

As illustrated in FIG. 2-(i), the data output control unit 13 reads the image data from the line memory 21a of the data control unit 12, and supplies the image data to the memory 6 via the data output interface circuit 16 and the bus 17. Each time the line synchronizing signal is supplied, the data output control unit 13 switches the sources of image data between the line memories 21a and 21b to transfer the image data to the memory 6 via the data output interface circuit 16 and the bus 17.

Figure 3:
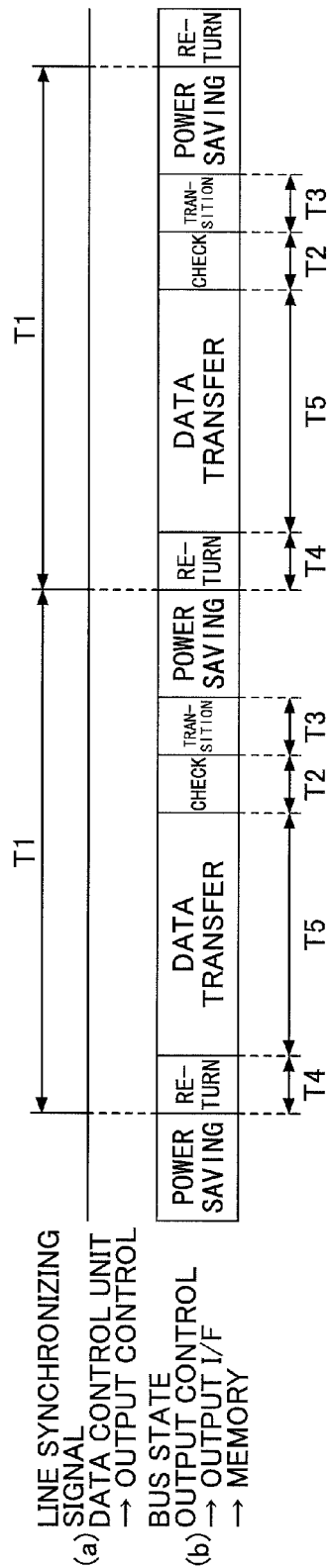
FIG. 3 is a timing chart illustrating an example of a line synchronizing signal and a bus state when line isochronism is maintained after a transition to a power saving state.

FIG. 3 is a drawing illustrating the line synchronizing signal and the state of the data output interface circuit 16 and the bus 17 connecting between the data output interface circuit 16 and the memory 6 in the case where line isochronism is maintained even when the data output interface circuit 16 and the bus 17 make a transition to the power saving state in each interval between line synchronizing signals.

In this case, the data output control unit 13 supplies a data-transfer requesting signal to the data output interface circuit 16 upon receiving a line synchronizing signal from the data control unit 12 (i.e., the start of a line synchronizing signal interval T1). The data output control unit 13 then exchanges, with the data output interface circuit 16, predetermined signals relating to the transfer of image data for one line. As a result, the data output interface circuit 16 and the bus 17 return from the power saving state upon passage of the return period T4. At the timing coinciding with this return, the data output control unit 13 transfers image data for one line to the memory 6 via the data output interface circuit 16 and the bus 17 (which is illustrated as "data transfer" in FIG. 3).

Upon completion of the transfer of image data for one line, the data output interface circuit 16 and the bus 17 take the predetermined check period T2 and the transition period T3 to make a transition to the power saving state (which is illustrated as "power saving" in FIG. 3).

Here, the operation that the data output interface circuit 16 and the bus 17 make a transition to the power saving state may refer to an operation by which the signals output from the data output interface circuit 16 to the memory 6 via the bus 17 are placed in an electrically idle state, and/or an operation by which a clock signal supplied from an external device to the data output interface circuit 16 is suspended.

The operation by which the signals output from the data output interface circuit 16 to the memory 6 via the bus 17 are placed in an electrically idle state refers to an operation by which a clock signal output from the data output interface circuit 16 to the memory 6 via the bus 17 is suspended, for example.

In the case of FIG. 3, the transfer of image data for one line (i.e., the data transfer period T5) is completed within the line synchronizing signal interval T1. As a result, line isochronism is maintained even when the data output interface circuit 16 and the bus 17 enter the power saving state once in each line synchronizing signal interval T1.

The pseudo-data transfer determining unit 14 has the following information, as illustrated in FIG. 3, stored in memory (i.e. internal memory) as conditions for determining whether to transfer pseudo data. Namely, the pseudo-data transfer determining unit 14 has stored in advance in the internal memory the number of counts T1 indicative of the length of one line cycle (i.e., the interval of line synchronizing signals), and also uses the number of counts T2 indicative of the length of a predetermined check period for determining whether to make a transition to the power saving state. Moreover, the pseudo-data transfer determining unit 14 has also stored in advance in the memory the number of counts T3 indicative of the length of a transition period required for the data output interface circuit 16 and the bus 17 to make a transition from the normal state to the power saving state and the number of counts T4 indicative of the length of a return period required for the data output interface circuit 16 and the bus 17 to return from the power saving state to the normal state. Upon the start of transfer of image data from the data output control unit 13 to the memory 6 via the data output interface circuit 16 and the bus 17, the pseudo-data transfer determining unit 14 uses the count unit 18 to count the number of counts T5 indicative of the length of image data transfer for one line. The pseudo-data transfer determining unit 14 then stores in memory the number of counts obtained by the above-noted counting operation as the data transfer period T5.

In the image processing apparatus 1, line isochronism is required for the transfer of image data. The data output interface circuit 16 and the bus 17 are thus designed to be able to transfer image data for one line within the line synchronizing signal interval T1. This means that T5<T1 is always satisfied.

In the image processing apparatus 1, the data output control unit 13 transfers image data to the memory 6 via the data output interface circuit 16 and the bus 17 as described above. As illustrated in FIG. 3, the data output interface circuit 16 is provided with the function to cause the data output interface circuit 16 and the bus 17 to enter the power saving state when the state of no data transfer continues for the predetermined check period T2. Because of this function, line isochronism may be lost as illustrated in FIG. 4, for example.

Figure 4:
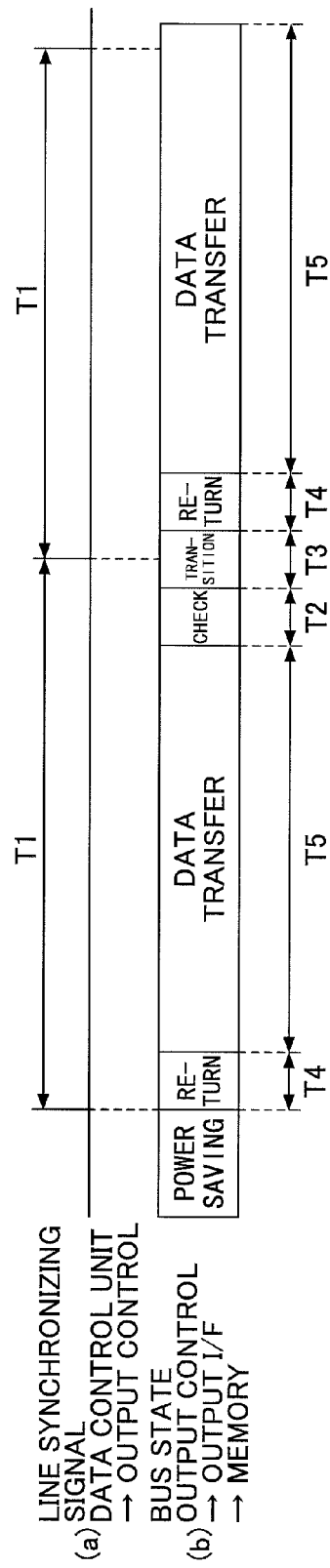
FIG. 4 is a timing chart illustrating an example of a line synchronizing signal and a bus state when line isochronism is not maintained after a transition to a power saving state.

In the case of FIG. 4, the data transfer period T5 for transferring image data for one line is longer than the data transfer period appearing in FIG. 3. After completion of the transfer of image data for the first line in FIG. 4, the next line synchronizing signal is supplied in the middle of the transition period T3 upon passage of the predetermined check period T2. After the completion of the transition period T3, the data output interface circuit 16 and the bus 17 return to the normal state by taking the return period T4, followed by the start of transfer of image data for the next one line.

In FIG. 4, therefore, the start of transfer of image data is delayed relative to the timing of a line synchronizing signal, compared to the operation illustrated in FIG. 3. Before the completion of transfer of image data for the above-noted next one line, the next line synchronizing signal is supplied. Namely, the next line synchronizing signal is supplied in the middle of the transfer of image data for the next one line.

Accordingly, the transfer of image data for the above-noted next one line is not accommodated within the current line synchronizing signal interval T1, and extends into the next line synchronizing signal interval T1 In the case of FIG. 4, line isochronism is lost.

As was previously described in connection with FIG. 1 and FIG. 2, the data input interface circuit 11 transfers image data for one line to the data control unit 12 once in each line synchronizing signal interval T1. When line isochronism is lost as described above in connection with FIG. 4, the data output control unit 13 cannot complete the outputting of image data for one line within the line synchronizing signal interval T1.

Consequently, the timing at which the data output control unit 13 starts reading image data for the next one line from the line memory 21a or 21b of the data control unit 12 is delayed. As a result, the data output control unit 13 may suffer a risk of failing to complete the reading of image data for the above-noted next one line within the line synchronizing signal interval T1. In such a case, image data for the following one line may arrive from the data input interface circuit 11 before the image data for the above-noted next one line is all read from the line memory 21a or 21b of the data control unit 12, thereby overwriting the contents of the line memory. This may result in erroneous image data being transferred from the image processing unit 2 to the memory 6.

In the case of FIG. 4, isochronism is lost when T2+T3+T4+T5>T1 is satisfied, as can be clearly understood from FIG. 4. In such case, the number of counts T5 required for data transfer, the number of counts T2 required for determining whether to make a transition to the power saving state, the number of counts T3 required to make a transition to the power saving state, and the number of counts T4 required to return from the power saving state to the normal state are added up, and the total number of counts is larger than the number of counts T1 indicative of the line cycle. As a result, the following line synchronizing signal may arrive at the data output control unit 13 while image data for one line is being transferred, thereby destroying line isochronism.

As described above, in the image processing apparatus 1, line isochronism is required in order to properly transfer image data scanned by the scanner unit 5 to the memory 6. In order to maintain line synchronism, the pseudo-data transfer determining unit 14 checks whether the inequality relationship "T2+T3+T4+T5>T1" is satisfied upon the completion of transfer of image data for one line, i.e., checks whether there is a risk of destroying line isochronism. When the inequality relationship "T2+T3+T4+T5>T1" is satisfied, the pseudo-data transfer determining unit 14 detects that there is a risk of destroying line isochronism. Then, the pseudo-data transfer determining unit 14 supplies a pseudo-data-transfer requesting signal to the pseudo-data transfer unit 15 once in each check period T2 until the next line synchronizing signal is supplied, for example.

In response to the pseudo-data-transfer requesting signal from the pseudo-data transfer determining unit 14, the pseudo-data transfer unit 15 transfers pseudo data to the memory 6 via the data output interface circuit 16 and the bus 17. With this arrangement, line isochronism is maintained by prohibiting the data output interface circuit 16 and the bus 17 from entering the power saving state (i.e., from making a transition to the power saving mode).

Figure 7:
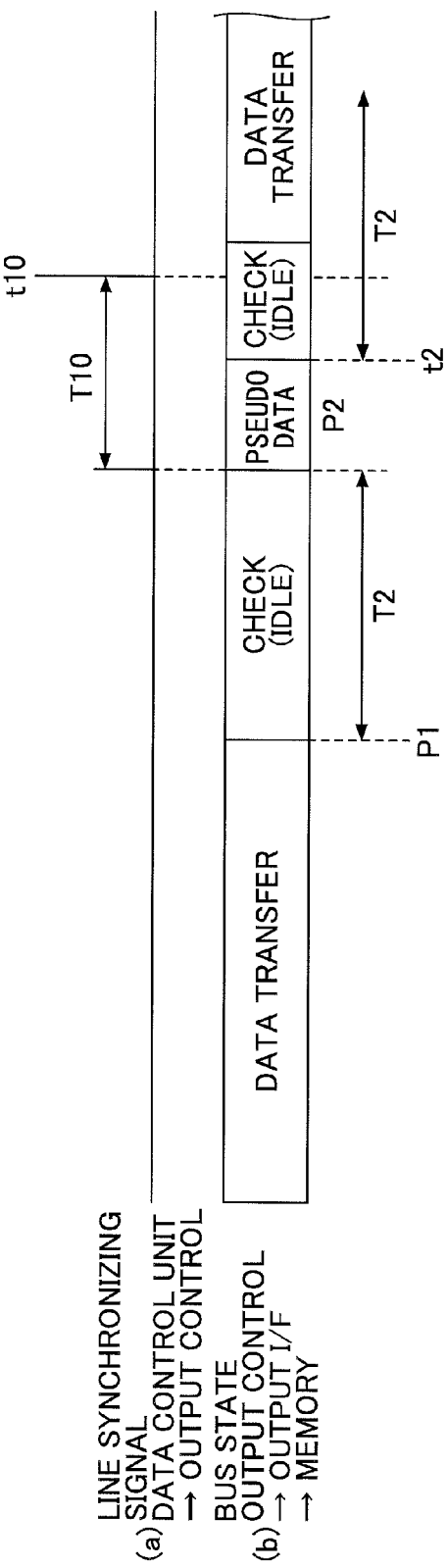
FIG. 7 is a timing chart illustrating an example of a line synchronizing signal and a bus state when pseudo data is transferred.

The pseudo-data transfer determining unit 14 performs the following operation as illustrated in FIG. 7 (which will be described later), which illustrates the states of the line synchronizing signal and the bus 17 when the transfer of pseudo data occurs. Namely, the pseudo-data transfer determining unit 14 checks whether the inequality relationship "T2+T3+T4+T5>T1" is satisfied upon the completion (P1) of transfer of image data for one line. When the above-noted inequality relationship is satisfied, the pseudo-data transfer determining unit 14 sends the pseudo-data-transfer requesting signal to the pseudo-data transfer unit 15. In response to the pseudo-data-transfer requesting signal, the pseudo-data transfer unit 15 transfers pseudo data (P2) to the memory 6 via the data output interface circuit 16 and the bus 17 before the end of the number of check counts T2 (i.e., before the end of the predetermined check period).

The next line synchronizing signal is supplied (t10) to the data output control unit 13 during the subsequent check period, so that the data output control unit 13 starts transferring image data for the next following one line.

In the manner describe above, the image processing apparatus 1 of the present embodiment uses the data output interface circuit 16 and the bus 17 to transfer image data for one line (i.e., line data) on a line-by-line basis to a predetermined destination (i.e., the memory 6) based on the line synchronizing signal.

The data output interface circuit 16 has the following functions. The data output interface circuit 16 and the bus 17 make a transition from the normal state to the power saving state when the state of no data transfer continues for the predetermined check period T2. In response to the occurrence of data transfer, the data output interface circuit 16 and the bus 17 return from the power saving state to the normal state to transfer the data.

The pseudo-data transfer determining unit 14 detects on a line-by-line basis the state of image data transfer that is performed from the data output control unit 13 via the data output interface circuit 16 and the bus 17. Based on the result of the detection, the pseudo-data transfer determining unit determines whether to transfer pseudo data (i.e., invalid data or dummy data) for the purpose of preventing the data output interface circuit 16 and the bus 17 from entering the power saving state.

Upon deciding to transfer pseudo data (i.e., invalid data or dummy data) for the purpose of preventing the data output interface circuit 16 and the bus 17 from entering the power saving state, the pseudo-data transfer determining unit 14 performs the following operation. The pseudo-data transfer determining unit 14 uses the pseudo-data transfer unit 15 to cause the pseudo data (i.e., invalid data or dummy data) to be transferred via the data output interface circuit 16 and the bus 17 to the destination such as the memory 6. This may be done by transmitting the pseudo-data-transfer requesting signal.

In this manner, the image processing apparatus 1 checks whether there is a risk of losing line isochronism separately for each line of the image data when line isochronism of image data is required. Upon determining that there is a risk of losing line isochronism, the image processing apparatus 1 transfers pseudo data to the destination (i.e., the memory 6) via the data output interface circuit 16 and the bus 17, thereby preventing the data output interface circuit 16 and the bus 17 from entering the power saving state. With this arrangement, line isochronism is maintained by preventing the data, output interface circuit 16 and the bus 17 from entering the power saving state upon determining that there is a risk of losing line isochronism. There may be a case in which line isochronism can be maintained without transferring pseudo data or in which line isochronism is not necessary. In such a case, the image processing apparatus 1 causes the data output interface circuit 16 and the bus 17 to enter the power saving state for each line synchronizing signal interval T1, thereby reducing power consumption in the data output interface circuit 16 and the bus 17.

Further, in the image processing apparatus 1 of the present embodiment, a user may make a setting by use of the CPU 3 serving as the setting unit, thereby setting the number of counts (i.e., periods) T1 through T4 used by the pseudo-data transfer determining unit 14 to determine whether to transfer pseudo data.

With this arrangement, the numbers of counts may be set as appropriate based on the usage or condition of the image processing apparatus 1. This makes it possible to make a decision as to whether to transfer pseudo data by taking into account the interface type of the data output interface circuit 16 and the bus 17.

In the embodiment described above, the pseudo-data transfer unit 15 may transfer packet data having zero data size as pseudo data when the type of image data transfer is packet data transfer. The data transfer destination may be comprised of address space as in the case of a memory device. In such a case, the transfer of pseudo data may be performed by making write access to an invalid address, or may be performed by writing the same data to the same address that is accessed by the last write access.

With this arrangement, line isochronism is maintained by transferring packet data having zero data size as pseudo data to easily prevent the data output interface circuit 16 and the bus 17 from entering the power saving state upon determining that there is a risk of losing line isochronism. When line isochronism can be maintained, the data output interface circuit 16 and the bus 17 are allowed to enter the power saving state for each line synchronizing signal interval T1 between the transfer of image data in one line and the transfer of image data in the next line, thereby reducing power consumption in the data output interface circuit 16 and the bus 17.

When there is a risk of losing line isochronism, the transfer of pseudo data is performed by making a write access to an invalid address or by writing the same data to the same address that was accessed by the last write access, thereby easily preventing the data output interface circuit 16 and the bus 17 from entering the power saving state. Accordingly, line isochronism is easily maintained. When line isochronism can be maintained, the data output interface circuit 16 and the bus 17 are allowed to enter the power saving state for each line synchronizing signal interval T1 between the transfer of image data in one line and the transfer of image data in the next line, thereby reducing power consumption in the data output interface circuit 16 and the bus 17.

There may be a case in which the transfer of pseudo data performed for the purpose of maintaining line isochronism may affect the transfer of image data for the next line, i.e., may affect line isochronism for the transfer of image data for the next line. In an example illustrated in FIG. 10, the transfer of pseudo data (P2) extends across the boundary of two adjacent line synchronizing signal intervals T1. In such a case, the transfer of pseudo data may affect line isochronism for the transfer of image data for the next line. In order to avoid this situation, the transmission of a pseudo-data-transfer requesting signal to the pseudo-data transfer unit 15 may be performed at the timing that precedes by the number of check counts T2 (i.e., the predetermined check period) the next line synchronizing signal, as illustrated in FIG. 11, which will be described later. Namely, the transmission (P2) of pseudo data by the pseudo-data transfer unit 15 may be performed at timing t1 that precedes by the number of check counts T2 (i.e., the predetermined check period) the next line synchronizing signal t10.

With this arrangement, the pseudo data is transferred (P2) at the timing that does not affect the transfer of image data for the next line, thereby securely preventing the loss of line isochronism by transferring pseudo data.

A description has been given above of the case in which a setting may be made by use of the CPU 3, thereby setting the number of counts T1 through T4 used by the pseudo-data transfer determining unit 14 to determine whether to transfer pseudo data. Nonetheless, the number of counts T1 indicative of the line cycle may be counted by the pseudo-data transfer determining unit 14, which uses the count unit 18 to count the number of counts for the interval between line synchronizing signals. In such a case, T1 is not yet determined when the transfer of image data for the first line comes to an end, which means that a check cannot be made as to whether to transfer pseudo data. In consideration of this, the pseudo-data transfer determining unit 14 may transmit the pseudo-data-transfer requesting signal without exception for the first line, thereby reliably preventing the data output interface circuit 16 and the bus 17 from entering the power saving state.

With the configuration in which the pseudo-data transfer determining unit 14 uses the count unit 18 to count the number of counts T1 for the interval between line synchronizing signals, the pseudo-data transfer determining unit 14 becomes applicable to image processing apparatuses having different line cycles or to an image processing apparatus having a varying line cycle. Namely, universal applicability is improved.

A description has been given above of the case in which the pseudo-data transfer determining unit 14 determines whether to transfer pseudo data based on the relationship regarding the numbers of counts T1 through T5. In this case, the determination that line isochronism is not lost and that the transfer of pseudo data is unnecessary is obtained when T2+T3+T4+T5=T1. In such a case, however, the next line synchronizing signal arrives immediately after the passage of the transition period T3. The power saving state cannot be used since the duration of power saving state becomes zero. In consideration of this, the number of counts T6 indicative of the length of a period during which the power saving state is maintained may be used as an additional check condition. Namely, T2+T3+T4+T5+T6>T1 is used in place of T2+T3+T4+T5>T1 as a check criterion for determining whether to transfer pseudo data. Namely, when T2+T3+T4+T5+T6>T1 is satisfied, the transfer of pseudo data is performed. On the other hand, when T2+T3+T4+T5+T6≤T1 is satisfied, the transfer of pseudo data is not performed.

With this arrangement, a determination can be made such that a transition to the power saving state is made only when some power saving effect can be achieved (by choosing not to transfer pseudo data). This achieves efficient reduction of power consumption.

A description has also been given above of the case in which the pseudo-data transfer determining unit 14 counts on a line-by-line basis the number of counts T5 indicative of the length of a period during which image data for one line is transferred. It may be noted that the length T5 of the period for transferring image data for one line is constant when no wait (i.e., wait request) arrives from an external device during the transfer of image data from the data output control unit 13 to the external memory 6. In such a case, the counting of the number of counts T5 for the transfer of image data for the second line and onwards can be dispensed with, without performing repetitious counting. Namely, a determination that is made based on the number of counts T5 for transferring image data for the first line as to whether to transfer pseudo data may be used for the transfer of image data for any given line of interest that comes thereafter.

With this arrangement, the function of the pseudo-data transfer determining unit 14 to determine whether to transfer pseudo data may properly be suspended for the transfer of image data for the second line and onwards. This achieves further reduction of electrical power consumption. Moreover, yet further reduction of power consumption can be achieved when the determination as to whether to transfer pseudo data made based on the number of counts T5 for transferring image data for the first line indicates no need for the transfer of pseudo data. Namely, for the transfer of image data for the second line and onwards, the function of the pseudo-data transfer determining unit 14 to determine whether to transfer pseudo data may properly be suspended, and, also, the function of the pseudo-data transfer unit 15 may properly be suspended.

Figure 5:
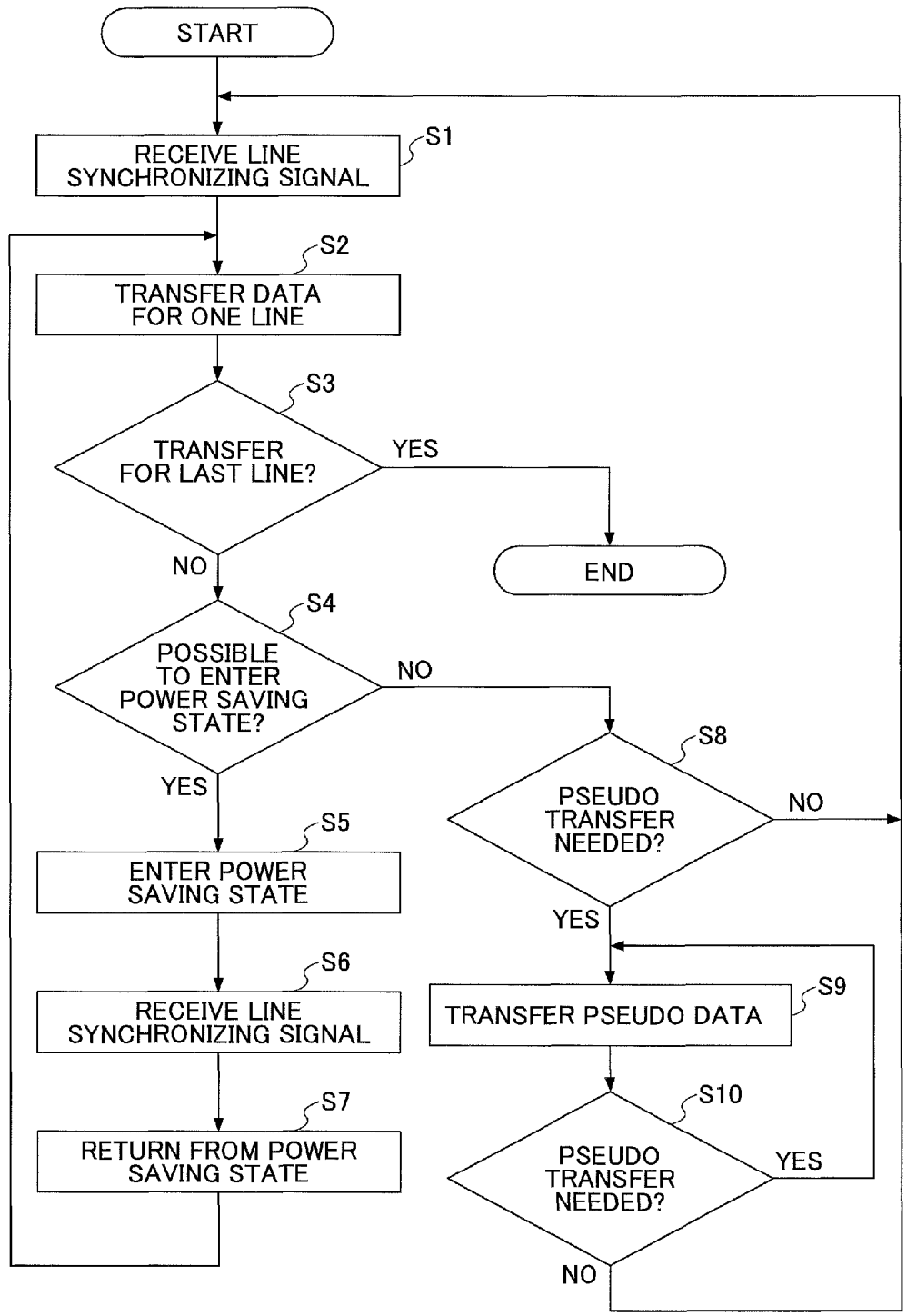
FIG. 5 is a flowchart illustrating an example of the operation sequence for making a transition to a power saving state and returning from the power saving state.

FIG. 5 is a flowchart illustrating an example of the operations of the data output control unit 13, the data output interface circuit 16, the pseudo-data transfer determining unit 14, and the pseudo-data transfer unit 15 of the image processing unit 2 in the image processing apparatus 1 according to the present embodiment.

In FIG. 5, the arrival of a pulse of the line synchronizing signal in step S1 triggers the data output control unit 13 to transfer image data for one line to the memory 6 via the data output interface circuit 16 and the bus 17 (step S2). In step S2, the time length from the arrival of the pulse of the line synchronizing signal to the completion of transfer of image data for the corresponding one line is measured (i.e., counted). The purpose of doing this is to obtain, in step S8 which will be described later, the time length from the completion of transfer of image data for one line to the occurrence (i.e., arrival) of the next pulse of the line synchronizing signal by subtracting the above-noted measured time length from the line synchronizing signal interval T1. In step S2, also, the time length (T1) from the start to the end of the transfer of image data for the one line is measured (i.e., counted). This time length will be used, in step S4 which will be described later, to determine whether it is possible to make a transition to the power saving state (which is illustrated as "transition to power saving" in FIG. 5).

In step S3, a check is made as to whether the transfer of image data for the corresponding one line is the transfer of image data for the last line. This check may be made by detecting whether image data is written to one of the line memories 21a and 21b of the data control unit 12 when the image data for the corresponding one line is read from the other one of the line memories 21a and 21b. When image data is not written to such a one of the line memories 21a and 21b of the data control unit 12, it can be ascertained that the transfer of image data for the corresponding one line is the transfer of image data for the last line. On the other hand, when image data is written to such a one of the line memories 21a and 21b of the data control unit 12, it can be ascertained that the transfer of image data for the corresponding one line is not the transfer of image data for the last line.

When the check in step S3 indicates that the transfer of image data for the corresponding one line is the transfer of image data for the last line (YES), the procedure of FIG. 5 comes to an end. When the check in step S3 indicates that the transfer of image data for the corresponding one line is not the transfer of image data for the last line (NO), the procedure proceeds to step S4.

In step S4, the pseudo-data transfer determining unit 14 determines whether it is possible to place the data output interface circuit 16 and the bus 17 in the power saving state.

The fact that it is possible to place the data output interface circuit and the bus 17 in the power saving state means that there is no risk of loss of line isochronism upon placing the data output interface circuit 16 and the bus 17 in the power saving state. That is, the situation as illustrated in FIG. 4 does not occur even when the data output interface circuit 16 and the bus 17 make a transition to the power saving state.

Specifically, in the case of T2+T3+T4+T5>T1, the pseudo-data transfer determining unit 14 ascertains that it is not possible (NO) to place the data output interface circuit 16 and the bus 17 in the power saving state. In this case, the procedure proceeds to step S8. In the case of T2+T3+T4+T5≤T1, on the other hand, the pseudo-data transfer determining unit 14 ascertains that it is possible (YES) to place the data output interface circuit 16 and the bus 17 in the power saving state. In this case, the procedure proceeds to step S5. This is because there is a risk of losing line isochronism in the case of T2+T3+T4+T5>T1 as illustrated in FIG. 4 and as previously described.

In step S5, the data output interface circuit 16 performs the following operation when the predetermined check period T2 passes without the arrival of a data-transfer requesting signal upon completion of the transfer of image data for one line. Namely, the data output interface circuit 16 and the bus 17 make a transition to the power saving state upon passage of the transition period T3 (see FIG. 3). The detail of transition of the data output interface circuit 16 and the bus 17 to the power saving state has already been described.

In step S6, the data output control unit 13 transmits a data-transfer requesting signal to the data output interface circuit 16 upon the arrival of a next pulse of the line synchronizing signal. The data output control unit 13 then exchanges, with the data output interface circuit 16, predetermined signals relating to the transfer of image data for the next one line. As a result, the data output interface circuit 16 and the bus 17 return from the power saving state upon passage of the return period T4 (step S7). The procedure then goes back to step S2 to repeat step S2 and the subsequent steps.

In step S8, the pseudo-data transfer determining unit 14 checks whether to transfer pseudo data. It has already been determined in step S4 that it is not possible (NO) to place the data output interface circuit 16 and the bus 17 in the power saving state. This means that the time length from the completion of transfer of image data for one line to the occurrence (i.e., arrival) of the next pulse of the line synchronizing signal is shorter as illustrated in FIG. 4 than in the case of FIG. 3. However, it may be the case that the next pulse of the line synchronizing signal may arrive during the predetermined check period T2 because the time length from the completion of transfer of image data for one line to the arrival of the next pulse of the line synchronizing signal is relatively short. In such a case, a transition (T3) that places the data output interface circuit 16 and the bus 17 in the power saving state does not occur due to the arrival of the next pulse of the line synchronizing signal, and the transfer of image data for the next line starts. Because of no occurrence of transition (T3), there is no risk of having the loss of line isochronism illustrated in FIG. 4. It can be ascertained that there is no need to transfer pseudo data.

In step S8, a check is made as to whether the time length from the completion of transfer of image data for one line to the arrival of the next pulse of the line synchronizing signal is shorter than the predetermined check period T2. The time length from the completion of transfer of image data for one line to the arrival of the next pulse of the line synchronizing signal may be obtained as follows. Such a time length is obtained by subtracting, from the line synchronizing signal interval T1, the time length from the arrival of the pulse of the line synchronizing signal to the completion of transfer of image data for the corresponding one line as measured in step S2. When the time length from the completion of transfer of image data for one line to the arrival of the next pulse of the line synchronizing signal is shorter than the predetermined check period T2, the next pulse of the line synchronizing signal will arrive during the predetermined check period T2. This results in the transfer of image data for the next line being started without performing a transition (T3). In this case, the pseudo-data transfer determining unit 14 ascertains that the transfer of pseudo data is not necessary (NO in step S8). The procedure then returns to step S1.

On the other hand, the next pulse of the line synchronizing signal does not arrive during the predetermined check period T2 when the time length from the completion of transfer of image data for one line to the arrival of the next pulse of the line synchronizing signal is longer than the predetermined check period T2. In this case, a transition T3 occurs after the passage of the predetermined check period, thereby creating a risk of loss of line isochronism illustrated in FIG. 4 and previously described. In this case, the pseudo-data transfer determining unit 14 ascertains that the transfer of pseudo data is necessary (YES in step S8). The procedure then proceeds to step S9.

In step S9, the pseudo-data transfer determining unit 14 transmits a pseudo-data-transfer requesting signal to the pseudo-data transfer unit 15 during the predetermined check period T2. In response, the pseudo-data transfer unit 15 transfers image data to the memory 6 via the data output interface circuit 16 and the bus 17. In this manner, the transfer of pseudo data prior to the end of the predetermined check period T2 ensures that a transition (T3) by the data output interface circuit 16 to place the data output interface circuit 16 and the bus 17 in the power saving state does not occur. This avoids the situation in which line isochronism is lost as illustrated in FIG. 4 and as previously described.

In step S10, the pseudo-data transfer determining unit 14 checks whether to transfer pseudo data again. Namely, a check is made as to whether the time length from the completion (t2 in FIG. 7, for example) of transfer of pseudo data performed in step S9 to the arrival (t10 in FIG. 7, for example) of the next pulse of the line synchronizing signal is shorter than the predetermined check period T2.

The time length from the completion (t2) of transfer of pseudo data to the arrival (t10) of the next pulse of the line synchronizing signal may be obtained as follows. Such a time length is obtained by subtracting, from the line synchronizing signal interval T1, the time length from the arrival of the latest pulse of the line synchronizing signal to the completion (t2) of transfer (P2) of pseudo data.

When the time length from the completion (t2) of transfer of pseudo data to the occurrence (t10) of the next pulse of the line synchronizing signal is shorter than the predetermined check period T2, the next pulse of the line synchronizing signal will arrive (t10) during the predetermined check period T2 next following the completion (t2) of transfer of the pseudo data. This results in the transfer of image data for the next line being started without performing a transition (T3). In this case, the pseudo-data transfer determining unit 14 ascertains that the second-time transfer of pseudo data is not necessary (NO in step S10). The procedure then returns to step S1. Thereafter, step S1 and the subsequent steps will be performed.

When the time length from the completion (t2) of transfer of pseudo data to the occurrence (t10) of the next pulse of the line synchronizing signal is no shorter than the predetermined check period T2, the next pulse of the line synchronizing signal will not arrive during the predetermined check period T2 next following the completion (t2) of transfer of the pseudo data. In this case, a transition T3 occurs after the passage of the predetermined check period, thereby creating a risk of loss of line isochronism illustrated in FIG. 4 and previously described. In this case, the pseudo-data transfer determining unit 14 ascertains that the second-time transfer of pseudo data is necessary (YES in step S8). The procedure then proceeds to step S9. Thereafter, step S9 and step S10 will be repeatedly performed.

In the following, by referring to FIG. 6 through FIG. 11, a description will be given of an example of the timing of pseudo data transfer that is performed according to the flowchart of FIG. 5.

Figure 6:
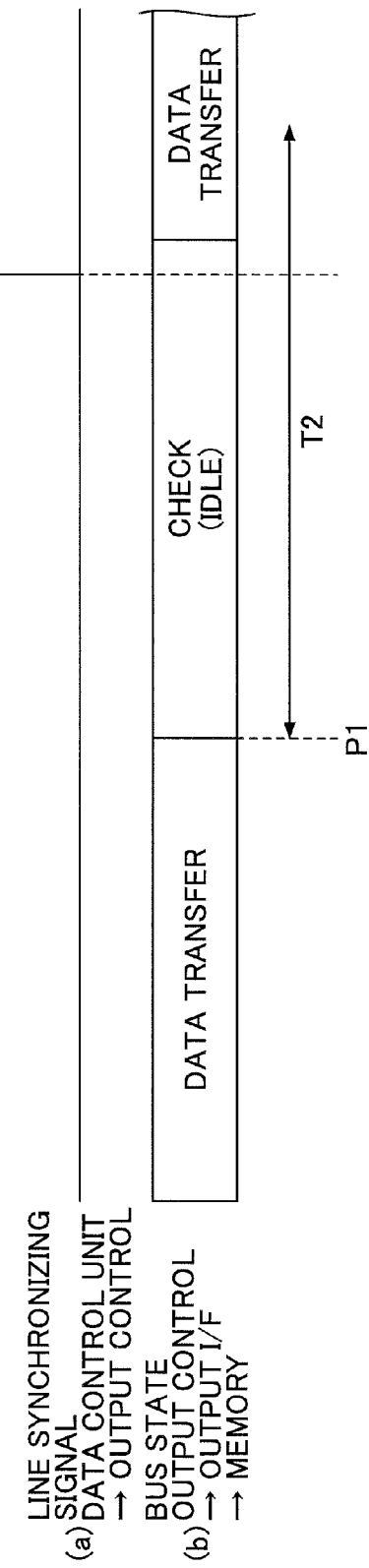
FIG. 6 is a timing chart illustrating an example of a line synchronizing signal and a bus state when pseudo data is not transferred.

FIG. 6 is a drawing illustrating the case in which the time length from the completion (P1) of transfer of image data for one line to the occurrence (t10) of the next pulse of the line synchronizing signal is shorter than the predetermined check period T2 (NO in step S8). In this case, the next pulse of the line synchronizing signal arrives (t10) during the predetermined check period T2, thereby starting the transfer of image data for the next line. A transition to the power saving state does not occur in this case. There is no need for pseudo data transfer because there is no risk of losing line isochronism resulting from the transition to the power saving state.

FIG. 7 is a drawing illustrating the case in which the time length from the completion (P1) of transfer of image data for one line to the occurrence (t10) of the next pulse of the line synchronizing signal is longer than the predetermined check period T2 (YES in step S8). In this case, the next pulse of the line synchronizing signal does not arrive during the predetermined check period T2. The transition T3 starts upon the passage of the predetermined check period T2, so that there is a risk of losing line isochronism illustrated in FIG. 4 and previously described. In this case, therefore, the transfer (P2) of pseudo data is performed in step S9, thereby preventing the transition to the power saving state. In the example illustrated in FIG. 7, the time length from the completion of transfer (P2) of pseudo data to the occurrence (t10) of the next pulse of the line synchronizing signal is shorter than the predetermined check period T2 (NO in step S10). In this case, the next pulse of the line synchronizing signal arrives (t10) during the predetermined check period T2 next following the transfer (P2) of pseudo data, thereby starting the transfer of image data for the next line. No transition to the power saving state is made, and there is no need for the second-time transfer of pseudo data.

Figure 8:
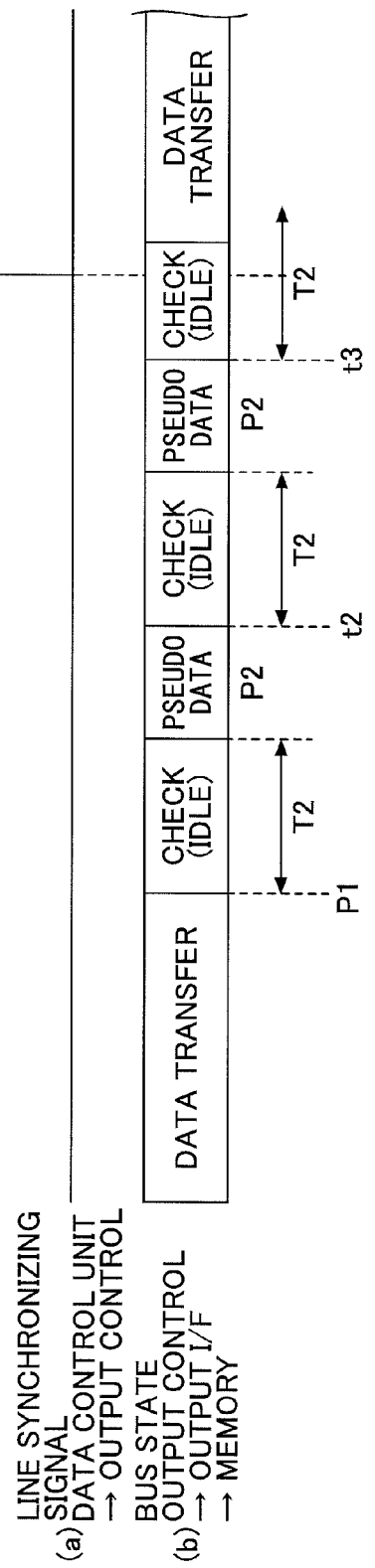
FIG. 8 is a timing chart illustrating another example of a line synchronizing signal and a bus state when pseudo data is transferred.

FIG. 8 is a drawing illustrating the case in which the time length from the completion (P1) of transfer of image data for one line to the occurrence (t10) of the next pulse of the line synchronizing signal is longer than the predetermined check period T2 (YES in step S8) as in the case of FIG. 7. In this case, as in the case of FIG. 7, the transfer (P2) of pseudo data is performed in step S9, thereby preventing the transition to the power saving state. In the example illustrated in FIG. 8, the time length from the completion (t2) of transfer (P2) of pseudo data to the occurrence (t10) of the next pulse of the line synchronizing signal is longer than the predetermined check period T2 (YES in step S10).

In this case, the next pulse of the line synchronizing signal does not arrive during the predetermined check period T2 starting after the transfer P2 of pseudo data (i.e., after t2). The transition T3 starts upon the passage of the predetermined check period T2, so that there is a risk of losing line isochronism. In this case, therefore, the transfer (P2: second time)

of pseudo data is performed again in step S9, thereby preventing the transition to the power saving state.

In the example illustrated in FIG. 8, the time length from the completion (t3) of the second-time transfer (P2) of pseudo data to the occurrence of the next pulse of the line synchronizing signal is shorter than the predetermined check period T2 (NO in step S10). In this case, the next pulse of the line synchronizing signal arrives (t10) during the predetermined check period T2 starting upon completion of the second-time transfer (P2) of pseudo data (i.e., upon t3), thereby starting the transfer of image data for the next line. No transition to the power saving state is made in this case, and there is no need for another (third-time) transfer of pseudo data.

In the case of FIG. 7 and FIG. 8 described above, the transfer (P2) of pseudo data in step S9 is started during the predetermined check period T2 and at the end of a predetermined time period following the start of the predetermined check period T2. The timing that is "during the predetermined check period T2 and at the end of a predetermined time period following the start of the predetermined check period T2" may be a timing immediately before the end of the predetermined check period T2 as in the examples illustrated in FIG. 7 and FIG. 8. A minimum size packet may be used as pseudo data. In such a case, i.e., when the time required for transferring (P2) pseudo data is shorter than the predetermined check period T2, the transfer of pseudo data at the timing immediately before the end of the predetermined check period T2 can effectively reduce the number of transfers of pseudo data (see FIG. 8). The transfer (P2) of pseudo data in step S9 is not limited to this example.

Figure 9:
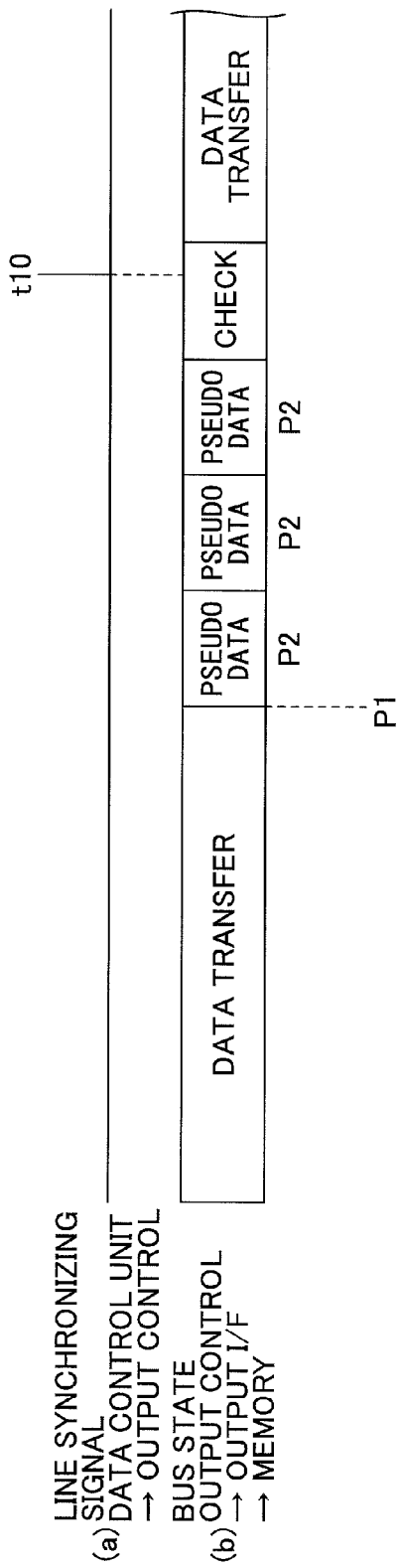
FIG. 9 is a timing chart illustrating yet another example of a line synchronizing signal and a bus state when pseudo data is transferred.

In another example, the transfer (P2) of pseudo data in step S9 that is performed immediately after the "YES" response to the check in step S8 may be performed immediately after the completion of transfer of image data for one line. Further, the transfer (P2) of pseudo data in step S9 that is performed as a result of the "YES" response to the check in step S10 may be performed immediately after the completion of the immediately preceding transfer of pseudo data performed in step S9. FIG. 9 is a drawing illustrating such an example.

In the case of FIG. 9, the transfer of pseudo data is performed (step S9) immediately after the transfer of immediately preceding data (i.e., image data or pseudo data) when the result of a check made in step S8 is YES or when the result of a check made in step S10 is YES. In the case of FIG. 9, the first-time transfer (P2) of pseudo data is performed in step S9 upon a YES response to a check in step S8. Thereafter, the second-time transfer (P2) of pseudo data is performed in step S9 upon a YES response to a check in step S10. After this, the result of the second-time check made in step S10 is also YES, resulting in the third-time transfer (P2) of pseudo data being performed in step S9. The result of the third-time check made in step S10 is NO, resulting in the fourth-time transfer of pseudo data being not performed. The result of a check made in step S8 becomes YES or the result of a check made in step S10 becomes YES when the time length from the completion (P1) of transfer of image data for one line, or from the completion of transfer (P2) of immediately preceding pseudo data, to the occurrence (t10) of the next pulse of the line synchronizing signal is longer than the predetermined check period T2.

In the case of FIG. 9, the completion (P1) of transfer of image data for one line is immediately followed by the first transfer (P2) of pseudo data, which is immediately followed by the second-time transfer (P2) of pseudo data, which is further immediately followed by the third-time transfer (P2) of pseudo data. In this case, the transfer of image data for the first line, the first transfer of pseudo data, the second transfer of pseudo data, and the third transfer of pseudo data are continuously performed.

Figure 10:
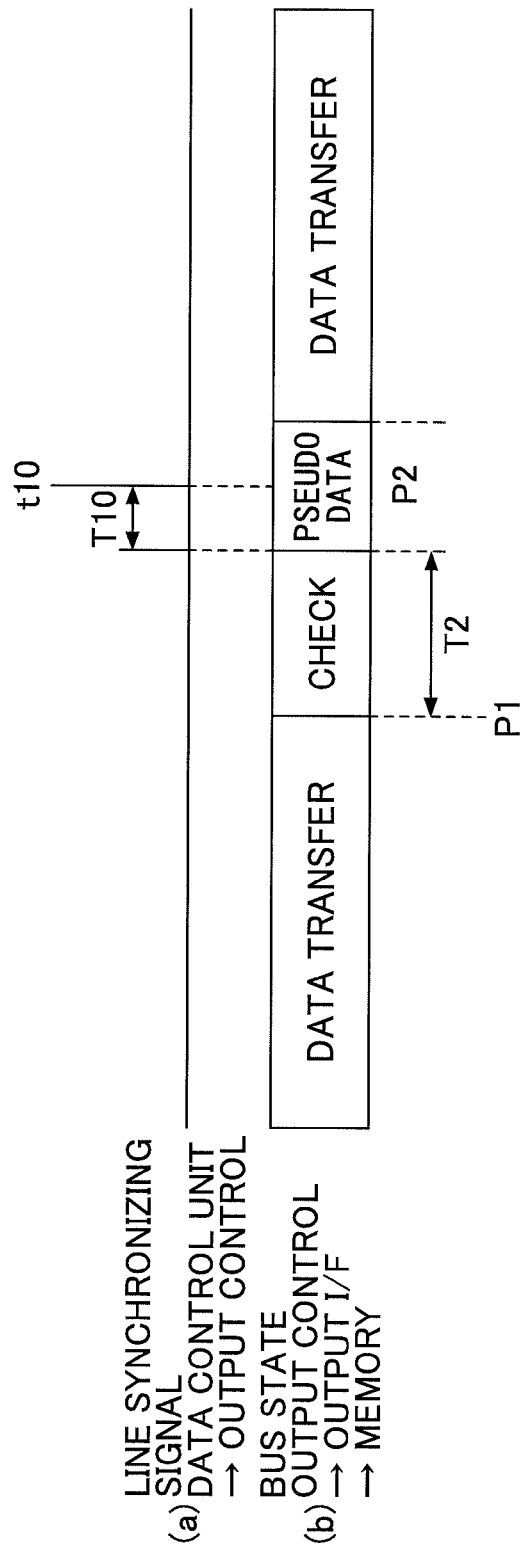
FIG. 10 is a timing chart illustrating an example of a line synchronizing signal and a bus state when the timing for transferring pseudo data affects the transfer of a next line.
Figure 11:
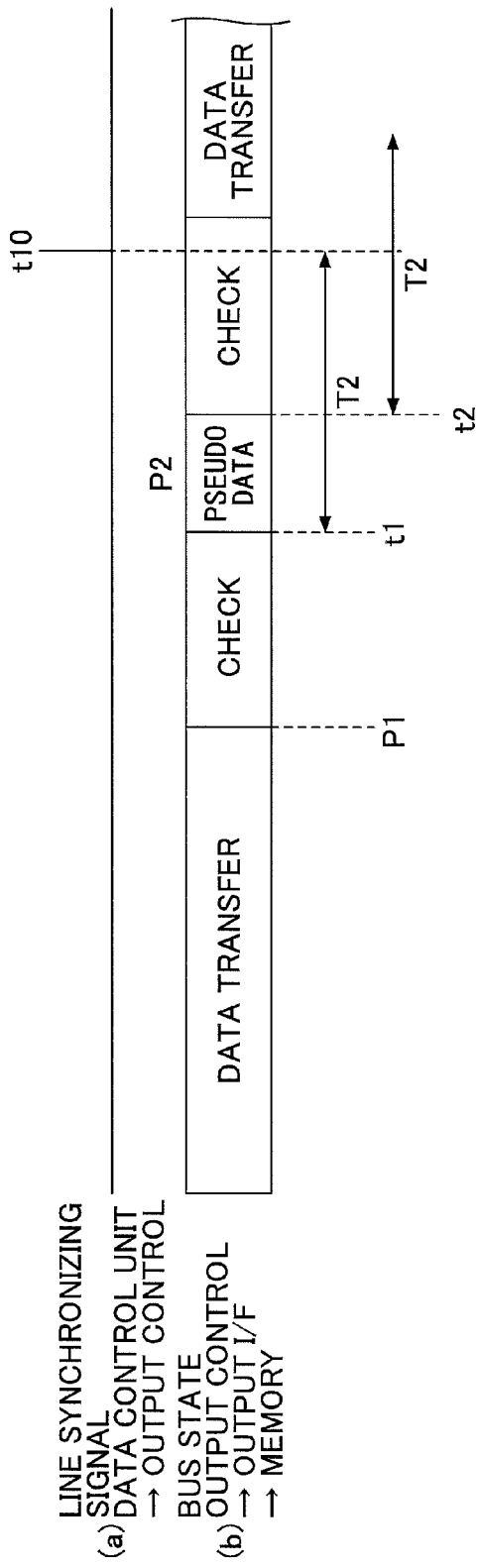
FIG. 11 is a timing chart illustrating an example of a line synchronizing signal and a bus state when pseudo data is transferred at the timing that precedes by T2 the next line synchronizing signal.

FIG. 10 is a drawing illustrating the occurrence (t10) of a next pulse of the line synchronizing signal during the transfer (P2) of pseudo data. In this case, the transfer (P2) of pseudo data delays the start of transfer of image data for the next line, which may affect line isochronism. In order to avoid this situation, as illustrated in FIG. 11, the start of transfer (P2) of pseudo data may be set at the timing that precedes, by the predetermined check period T2, the occurrence (t10) of the next pulse of the line synchronizing signal.

In this case, the predetermined check period T2 is subtracted from the time length from the completion (P1) of transfer of image data for one line, or from the completion of transfer (P2) of immediately preceding pseudo data, to the occurrence (t10) of the next pulse of the line synchronizing signal. The period T10 (see FIG. 7 and FIG. 10) obtained by the above-noted subtraction is compared with the time length required for the transfer (P2) of pseudo data. When the time length required for the transfer (P2) of pseudo data is longer than the period (T10) obtained by the subtraction, the next pulse of the line synchronizing signal arrives (t10) during the transfer (P2) of pseudo data, resulting in the condition illustrated in FIG. 10. On the other hand, when the time length required for the transfer (P2) of pseudo data is shorter than the period (T10) obtained by the subtraction, the next pulse of the line synchronizing signal does not arrive (t10) during the transfer of pseudo data, resulting in the condition illustrated in FIG. 7, for example.

Accordingly, provision may be made such that when the time length required for the transfer (P2) of pseudo data is longer than the period (T10) obtained by the subtraction (as illustrated in FIG. 10), the operation as illustrated in FIG. 11 is performed. Namely, the start of transfer (P2) of pseudo data may be set at the timing (t1) that precedes, by the predetermined check period T2, the occurrence (t10) of the next pulse of the line synchronizing signal. As a result, the next pulse of the line synchronizing signal arrives (t10) before the end of the predetermined check period T2 next following the completion (t2) of transfer (P2) of pseudo data, thereby eliminating the need for the further transfer of pseudo data (see FIG. 11). In this case, the result of a check made in step S10 is NO.

On the other hand, when the time length required for the transfer (P2) of pseudo data is shorter than the period (T10) obtained by the subtraction (as in the case of FIG. 7), the situation as illustrated in FIG. 10 does not occur. In such a case, the transfer (P2) of pseudo data may be started at the timing immediately before the end of the predetermined check period T2 as was described in connection with FIG. 7 and FIG. 8, for example In the following, a description will be given of examples of numeral values of the periods T1 through T5.

An example of the line synchronizing signal interval T1 is as follows. It is assumed that the sheet size is A3, and pixel density is 600 dpi (dots per inch). With a print speed of 30 sheets per minute, it takes 2 seconds to produce one printout sheet. Since the number of lines in the sub-scan direction is 9921, the line cycle is 2/9921, which is nearly equal to 200 microseconds.

The predetermined check period T2 is shorter than 7 microseconds (variable) according to PCIe. The predetermined check period T2 is settable by use of the CPU 3 as was previously described. In this case, a period of 7 microseconds may be set as a default period.

The transition period T3 is estimated to be in the order of nanoseconds when taking into account the transition sequence defined for PCIe.

With respect to the return period T4, there are two types of power saving states, i.e., L0s and L1, according to ASPM. It takes a few hundred nanoseconds to a few microseconds to return from the power saving state L0s. It takes a few microseconds to a few tens of microseconds to return from the power saving state L1. In the power saving state L0s, a 60% to 70% reduction of power consumption as percentage of the power consumption in the normal state is expected to be achieved. In the power saving state L1, an 80% to 90% reduction of power consumption as percentage of the power consumption in the normal state is expected to be achieved.

The data transfer period T5 varies depending on the image size of transferred image data, the image resolution, the data format (e.g., compressed or not).

A minimum size packet (i.e., packet having zero data size) may be used as pseudo data transferred in step S9 of FIG. 5. The time length required for transfer of the minimum size packet is 44 nanoseconds according to the definitions of Gen1 (i.e., first generation) of PCIe.

Further, the present invention is not limited to these embodiments, but various variations and modifications may be made without departing from the scope of the present invention.

The present application is based on Japanese priority applications No. 2010-183613 filed on Aug. 19, 2010, and No. 2011-129011 filed on Jun. 9, 2011, with the Japanese Patent Office, the entire contents of which are hereby incorporated by reference.

What is claimed is:

1. An image processing apparatus, comprising:
a data output control unit to output image data on a line-by-line basis in response to a line synchronizing signal; and
a data output interface circuit to transfer via a bus the image data that is output from the data output control unit on a line-by-line basis in response to the line synchronizing signal,
wherein the data output interface circuit makes a transition, together with the bus, from a normal state to a power saving state when a predetermined check period next following completion of transfer, by the data output interface circuit, of image data for one line output from the data output control unit passes before transfer of image data for a next one line, and returns, together with the bus, from the power saving state to the normal state for transfer of image data for the next one line, and
wherein the image processing apparatus further comprises:
a pseudo-data transfer determining unit to detect a state of image data output from the data output control unit to the data output interface circuit on a line-by-line basis, and to decide based on the detected state whether to output pseudo data to the data output interface circuit before an end of the predetermined check period following completion of transfer, by the data output interface circuit, of image data for one line, the pseudo data serving to prevent the data output interface circuit and the bus from making a transition to the power saving state; and
a pseudo data transfer unit to output the pseudo data to the data output interface circuit before the end of the predetermined check period following completion of transfer, by the data output interface circuit, of image data for one line, the outputting of the pseudo data being in response to an event that the pseudo-data transfer determining unit decides to output the pseudo data to the data output interface circuit before the end of the predetermined check period following completion of transfer, by the data output interface circuit, of image data for one line.

2. The image processing apparatus as claimed in claim 1, wherein the pseudo-data transfer determining unit detects, as the state of image data, a data transfer period required for the data output control unit to output image data for one line to the data output interface circuit, and makes a decision to output the pseudo data to the data output interface circuit before the end of the predetermined check period following completion of transfer, by the data output interface circuit, of image data for one line, the making of a decision to output the pseudo data being in response to an event that a total time length of the data transfer period, the predetermined check period, a transition period, and a return period is longer than an interval between pulses of the line synchronizing signal, the transition period being a time period required for the data output interface circuit and the bus to make a transition from the normal state to the power saving state, and the return period being a time period required for the data output interface circuit and the bus to return from the power saving state to the normal state.

3. The image processing apparatus as claimed in claim 2, wherein the pseudo-data transfer determining unit makes a decision to output the pseudo data to the data output interface circuit before the end of the predetermined check period following completion of transfer, by the data output interface circuit, of image data for one line, the making of a decision to output the pseudo data being in response to concurrent occurrence of both an event that the total time length is longer than the interval between pulses of the line synchronizing signal and an event that a time length from when the data output control unit finishes outputting of image data for one line to an arrival of a next pulse of the line synchronizing signal at the data output control unit is longer than the predetermined check period.

4. The image processing apparatus as claimed in claim 2, further comprising a setting unit to set the interval between pulses of the line synchronizing signal, the predetermined check period, the transition period, and the return period.

5. The image processing apparatus as claimed in claim 2, further comprising a count unit to count the interval between pulses of the line synchronizing signal.

6. The image processing apparatus as claimed in claim 3, wherein the pseudo-data transfer unit outputs the pseudo data at a timing that precedes, by the predetermined check period, the next pulse of the line synchronizing signal, the outputting of the pseudo data being in response to concurrent occurrence of both an event that the total time length is longer than the interval between pulses of the line synchronizing signal and an event that a time length from when the data output control unit finishes outputting of image data for one line to the arrival of the next pulse of the line synchronizing signal is longer than the predetermined check period.

7. The image processing apparatus as claimed in claim 1, wherein the pseudo-data transfer unit outputs packet data having zero data size as the pseudo data when the image data comprises packet data.

8. The image processing apparatus as claimed in claim 1, wherein a data transfer destination of the image data comprises address space, and the pseudo-data transfer unit transfers data to an invalid address as the pseudo data, or transfers data the same as last transferred data as the pseudo data to an address the same as last specified address.

9. An image processing method, comprising:
- a data output step, performed by a data output control unit, of outputting image data on a line-by-line basis in response to a line synchronizing signal;
- a data transfer and state transition step of causing a data output interface circuit and a bus to make a transition from a normal state to a power saving state when a predetermined check period next following completion of transfer, by the data output interface circuit, of image data for one line output from the data output control unit passes before transfer of image data for a next one line, and causing the data output interface circuit and the bus to return from the power saving state to the normal state for transfer of image data for the next one line;
- a pseudo-data transfer determining step, performed by a pseudo-data transfer determining unit, of detecting a state of image data output from the data output control unit to the data output interface circuit on a line-by-line basis, and deciding based on the detected state whether to output pseudo data to the data output interface circuit before an end of the predetermined check period following completion of transfer, by the data output interface circuit, of image data for one line, the pseudo data serving to prevent the data output interface circuit and the bus from making a transition to the power saving state, and
- a pseudo data transferring step, performed by a pseudo data transfer unit, of outputting the pseudo data to the data output interface circuit before the end of the predetermined check period following completion of transfer, by the data output interface circuit, of image data for one line, the outputting of the pseudo data being in response to an event that the pseudo-data transfer determining unit decides to output the pseudo data to the data output interface circuit before the end of the predetermined check period following completion of transfer, by the data output interface circuit, of image data for one line.

10. A non-transitory computer-readable recording medium having an information program embodied therein for causing a computer to control a data output interface circuit to perform a data output process for outputting image data on a line-by-line bases in response to a line synchronizing signal, the program causing the computer to perform:
- a data transfer and state transition step of causing the data output interface circuit and a bus to make a transition from a normal state to a power saving state when a predetermined check period next following completion of transfer, by the data output interface circuit, of image data for one line output from a data output control unit passes before transfer of image data for a next one line, and causing the data output interface circuit and the bus to return from the power saving state to the normal state for transfer of image data for the next one line;
- a pseudo-data transfer determining step, performed by a pseudo-data transfer determining unit, of detecting a state of image data output from the data output control unit to the data output interface circuit on a line-by-line basis, and deciding based on the detected state whether to output pseudo data to the data output interface circuit before an end of the predetermined check period following completion of transfer, by the data output interface circuit, of image data for one line, the pseudo data serving to prevent the data output interface circuit and the bus from making a transition to the power saving state, and
- a pseudo data transferring step, performed by a pseudo data transfer unit, of outputting the pseudo data to the data output interface circuit before the end of the predetermined check period following completion of transfer, by the data output interface circuit, of image data for one line, the outputting of the pseudo data being in response to an event that the pseudo-data transfer determining unit decides to output the pseudo data to the data output interface circuit before the end of the predetermined check period following completion of transfer, by the data output interface circuit, of image data for one line.

* * * * *